(12) United States Patent
Kim

(10) Patent No.: US 6,906,772 B2
(45) Date of Patent: Jun. 14, 2005

(54) LIQUID CRYSTAL DISPLAY DEVICE AND FABRICATION METHOD THEREOF

(75) Inventor: Yong-Wan Kim, Gyeongsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 49 days.

(21) Appl. No.: 10/310,044

(22) Filed: Dec. 5, 2002

(65) Prior Publication Data

US 2003/0123016 A1 Jul. 3, 2003

(30) Foreign Application Priority Data

Dec. 29, 2001 (KR) ........................................ 2001-88611

(51) Int. Cl.⁷ ............................................ G02F 1/1339
(52) U.S. Cl. ...................... 349/153; 349/154; 349/155; 349/190
(58) Field of Search ................................. 349/153, 154, 349/155, 149–152, 190, 139

(56) References Cited

U.S. PATENT DOCUMENTS

| | | | | |
|---|---|---|---|---|
| 5,396,356 A | * | 3/1995 | Fukuchi | 349/153 |
| 5,798,813 A | * | 8/1998 | Ohashi et al. | 349/154 |
| 6,696,324 B2 | * | 2/2004 | Hong et al. | 438/149 |
| 2001/0024245 A1 | * | 9/2001 | Choi et al. | 349/43 |
| 2002/0085161 A1 | * | 7/2002 | Yoo et al. | 349/155 |

* cited by examiner

Primary Examiner—Tarifur R. Chowdhury
Assistant Examiner—Michael H Caley
(74) Attorney, Agent, or Firm—Morgan, Lewis & Bockius LLP

(57) ABSTRACT

A liquid crystal display device including a first and second substrates coupled to each other having a dummy region and a panel region, at least one first seal in the dummy region, a second seal along a peripheral portion of the panel region, wherein the second seal has a liquid crystal injection port and a liquid crystal layer between the first and second substrates, wherein a cell gap-determining thickness of the first seal is substantially same as a cell gap-determining thickness of the second seal.

16 Claims, 5 Drawing Sheets

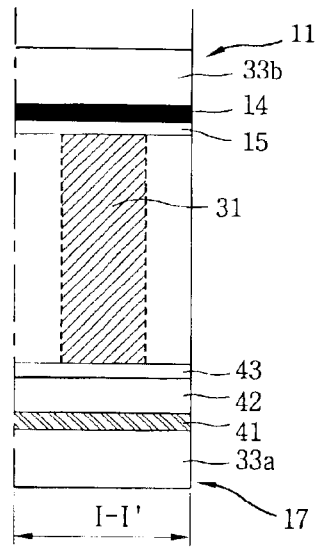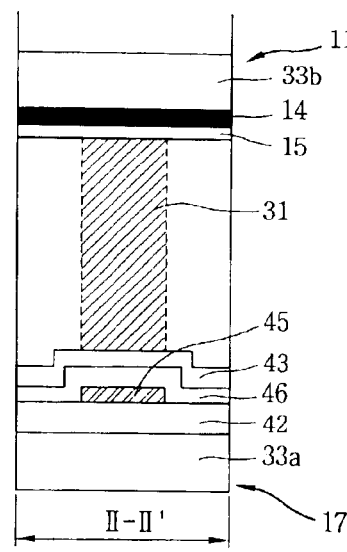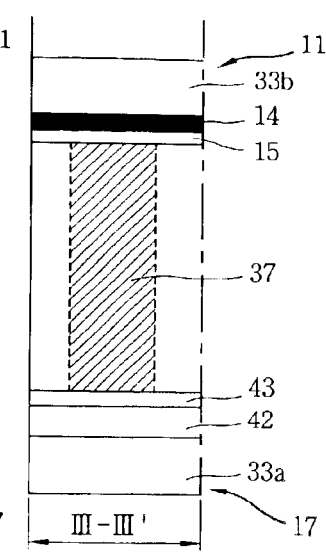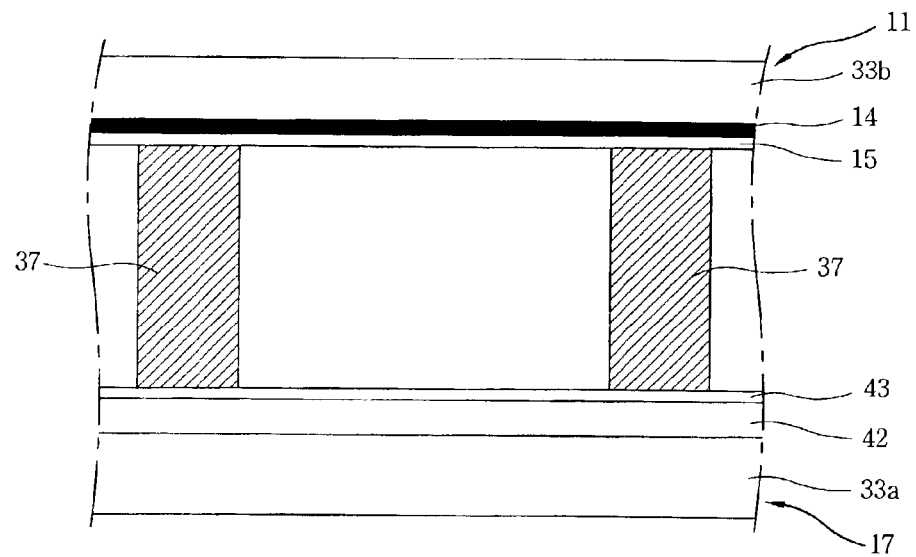

LIQUID CRYSTAL DISPLAY DEVICE AND FABRICATION METHOD THEREOF

This application claims the benefit of the Korean Application No. 2001-88611 filed in Korea on Dec. 29, 2001, which is hereby incorporated by reference in its entirety.

BACKGROUND OF THE INVENTION

1. Field of the Invention

The present invention relates to a liquid crystal display device and, more particularly, to a liquid crystal display device that is capable of maintaining a cell gap between an upper substrate and a lower substrate, and obtaining an air removing passage for exhausting air.

2. Description of the Related Art

In general, a liquid crystal display device is constructed of a pad unit and a display panel. The pad unit, which includes a driving circuit, transmits a signal to the display unit and the display panel transmits an image to a viewer corresponding to the signal. The display panel includes an upper substrate, a lower substrate and a liquid crystal, which is filled in between the upper and lower substrates.

FIG. 1 is an exploded perspective view showing the basic structure of a color liquid crystal display panel that uses a thin film transistor in each pixel. As shown in FIG. 1, a color filter 13 and a transparent common electrode 15 are formed on a lower side of the upper substrate 11, and a lower substrate 17 is positioned such that a specified interval or gap is between the upper substrate 11 and lower substrate 17. Subsequently, a liquid crystal (not shown) is filled between the two substrates.

The lower substrate 17 has an array of pixels that each include a switching device 21 and a transparent pixel electrode 29. The distinctiveness of an image displayed on a liquid crystal display panel is affected by the resolution, which is based upon the number and dimensions of the pixels formed in an array on the lower substrate 11. The dimensions of a pixel are designed according to the desired resolution of the liquid crystal display panel. A plurality of gate lines 25 and data lines 27, which cross-over each other in the a matrix form, are formed between the respective pixels. The pixel electrode 29 of a pixel applies an electric field across the liquid crystal between the upper substrate 11 and lower substrate 17 together with the common electrode 15. The thin film transistor 21 of a pixel is formed in the vicinity of where a gate line 25 and a data line 27 cross-over each other. The gate electrode (not shown) of the thin film transistor 21 connects to a gate line 25 and the source electrode (not shown) of the thin film transistor 21 connects to a data line 27.

The general fabrication process of a liquid crystal display panel includes forming an upper substrate with a common electrode on a color filter and a lower substrate with an array of pixels formed thereon. Then the upper and lower substrates are positioned such that the side of the upper substrate having the common electrode formed thereon faces the side of the lower substrate having the pixels formed thereon. Subsequently, a seal line is formed between the two substrates about the perimeter of the two substrates with an opening in the seal to be used as an injection port. Thereafter, a liquid crystal is injected between the upper substrate and the lower substrate, and the injection port is sealed, thereby completing the liquid crystal display panel. The light transmittance of the liquid crystal display panel is controlled by a voltage applied to each pixel electrode such that an image is displayed by controlling the liquid crystal to have a light shutter effect.

Fabrication of a liquid crystal display panel has the characteristics that, compared with the thin film transistor (TFT) process or the color filter process, there is no repeated step. The fabrication of a liquid crystal display panel can generally be divided into the steps of forming an orientation film for orienting liquid crystal, forming a cell gap and cutting a master panel into panels. The fabrication process of the liquid crystal display device will now be described with reference to FIG. 2, which depicts a flow chart for fabricating a liquid crystal display panel from a master panel. First, referring to the step ST1 in FIG. 2, a plurality of thin film transistors (TFTs) are arranged as switching devices on the lower substrate where pixel electrodes are then formed for each TFT. Next, as referred to in step ST2, an orientation film is formed on the lower substrate and processed. Forming the orientation film can include the coating of a copolymer thin film and the step of processing the orientation film can include the steps of rubbing the copolymer thin film.

Generally, the copolymer thin film is called an orientation film, which is typically coated with a uniform thickness on the entire lower substrate, and the rubbing is performed uniformly across the lower substrate. The process of rubbing determines an initial direction or arrangement of the liquid crystal. By rubbing the orientation film, the liquid crystal can be driven normally and uniform display characteristics can be obtained. In general, the orientation film is from the polyimide group or an organic substance. The process of rubbing is the act of rubbing the orientation film in a predetermined direction with a cloth such that the liquid crystal will subsequently align in the predetermined direction.

As referred to in step ST3 of FIG. 2, a seal pattern is formed enclosing designated areas of the master panel. The seal pattern can serve two functions. First, the seal pattern defines the panel of a liquid crystal display panel from the master panel as well as the gap of a panel. Secondly, the seal pattern prevents leakage of the injected liquid crystal from the panel unit. In the step ST3, the seal pattern is formed with a thermosetting resin deposited in a desired pattern using a screen printing technique.

Spacers with a predetermined size are sprayed or distributed, as referred to in step ST4 of FIG. 2, to maintain a uniform gap between the upper substrate and the lower substrate of a panel. Thus, the spacers should be sprayed or distributed with a uniform density across the lower substrate. Generally, the spacers are sprayed using a wet spray method in which a mixture of spacers and alcohol, or the like, is sprayed, or a dry spray method in which only the spacers are sprayed.

Subsequent to the spraying of spacers, the upper substrate and the lower substrate are attached, as referred to in step ST5 of FIG. 2. The precision in attaching the upper substrate and the lower substrate is such that the color filters are aligned with respective pixels is done within a error margin of a few microns. If the alignment of the two substrates is beyond the error margin, light leakage can degrade picture quality such that desired control of light transmission will not occur in driving of the liquid crystal display panel. Next, the master panel fabricated using the steps ST1–ST5 above is cut into panel units, as referred to in step ST6 of FIG. 2.

In an earlier fabrication process of a liquid crystal display panel that is different than the process described in steps ST1–ST5 above, liquid crystal was injected into the panels, defined by a seal pattern on the master panel, and then the panels were cut from the master panel into individual panels. Since the number of panels on a master panel and/or the size of the panels on the master panel have increased, the method described in steps ST1–ST5 is used to create the individual panels and then liquid crystal is injected into the individual panels. Cutting panels includes scribing a break line on the surface of the master panel with a pen made of a diamond or some other material having a hardness higher than that of the substrates, and applying a breaking force such that the substrates break along the break line. Then, as referred to in step ST7 of FIG. 2, liquid crystal is injected in each of the panels.

A liquid crystal display panel has a gap of a few micrometers between the upper and lower substrates over an area of hundreds of square centimeters. Therefore, a vacuum injection method using a pressure difference between the inside and the outside of the panel is widely used as a method for effectively injecting liquid crystal into such a panel.

Referring to the step ST5 described above, the uniformity of the thickness and height of the liquid crystal cell gap formed by the seal together with the spacers are critical factors that determine picture quality. However, the surface level of the lower substrate may not be uniform over the region where the seal is deposited, and thus the cell gap may not be not uniform in a liquid crystal panel. The occurrence of such a lack of uniformity in a liquid crystal cell gap of a related art liquid crystal display panel will now be described in detail with reference FIGS. 3, 4A, 4B and 4C and 5.

Typically, improved yields for liquid crystal display devices are sought by producing a plurality of liquid crystal display panels from a large-scale glass substrate 33 or master panel that is cut into panels such that a plurality of panels are formed simultaneously. Accordingly, seals 31 are printed on a large-scale glass substrate 33 to define a plurality of panels 32, as shown in FIG. 3. A seal 31 is printed along the periphery of each panel 32 formed on the large-scale glass substrate 33, and a liquid crystal injection port 35 is formed in the seal pattern 31 on one side of each panel 32.

A dummy seal pattern 37 is formed at a periphery of the glass substrate 33 and between the panels 32. The dummy seal pattern 37 serves as a support bar against a strong mechanical impact during a cutting step in which the large-scale glass substrate 33 is cut into panels, as described above with regard to step ST7 in FIG. 2. Thus, the dummy seal pattern prevents errant breakage of the upper substrate or the lower substrate other than along break lines on the substrates while maintaining the cell gap between the upper substrate and the lower substrate.

FIG. 3 depicts an enlarged portion of a panel 32 that includes an image display part 34 on which liquid crystal pixels are arranged in a matrix form, gate pads 38 connected to gate lines of the image display part 34 and data pads 36 connected to data lines. The gate pads 38 and the data pads 36 are formed at the respective peripheral regions of the lower substrate 17 which are not overlapped with the upper substrate 11 when the large-scale glass substrate 33 is broken into individual panels. The gate pads 38 supply a scan signal supplied from a gate driver integrated circuit to the gate lines of the image display part 34. The data pads 36 supply image information supplied from a data driver integrated circuit to the data line of the image display part 34.

As shown in the FIG. 3, the data lines from the data pads 36 on which the image information is supplied and gate lines from the gate pads 38 on which the scan signal is supplied are disposed to cross-over one another on the lower substrate of the image display part 34. Further, the lower substrate includes pixel cells between the gate and data lines that each have a thin film transistor for switching, a pixel electrode connected to the thin film transistor, and a passivation film formed over the pixel electrode and the thin film transistor of the pixel cells.

FIG. 3 does not show the color filters separately coated on the upper substrate for each pixel that are separated by a black matrix or the common electrode on all of the color filters. As stated above, the lower substrate and the upper substrate are separated by a cell gap that is filled with liquid crystal. The lower substrate and the upper substrate are attached by the seal 31 formed at the perimeter of the image display part 34, that has a data pad side 40a, a liquid crystal injection port side 40b, an open side 40c, and a gate pad side 40d.

The liquid crystal cell gap between the lower substrate and the upper substrate will now be described in detail in reference to sectional views of seal attachment regions. FIG. 4A shows a sectional view of a seal attachment region for the gate pad side 40d taken along line I–I' in FIG. 3. FIG. 4B shows the sectional view of a seal attachment region for the data pad side 40a taken along line II–II' in FIG. 3. FIG. 4C shows the sectional view of the seal attachment region for the dummy seals 37 taken along line III–III' in FIG. 3. The liquid crystal injection port side 40b and the open side 40c have a similar cross-section to FIG. 4C.

As shown in FIGS. 4A, 4B and 4C, the black matrix 14 and the common electrode 15 of the upper substrate 11 are formed on the glass substrate 33b uniformly over every region of the data pad side 40a, liquid crystal injection port side 40b, open side 40c, gate pad side 40d and the dummy seals 37. On the lower substrate 17 having the thin film transistor array thereon, seals 31 are formed over the gate pad side 40d, as shown in FIG. 4A, and formed over the data pad side 40a, as shown in FIG. 4B. The dummy seals 37 are formed, as shown in FIG. 4C, having a slightly larger thickness than the seals 31.

A gate insulation layer 42 made of silicon nitride film ($SiN_x$) and a passivation film 43 are sequentially stacked on the gate electrode layer 41, which is formed on the glass substrate 33a, at gate pad side 40d. The gate electrode layer 41 is formed to prevent static electricity that can be generated due to frequent movement of the substrates during fabrication of the liquid crystal display device. The total thickness of patterns formed on the lower substrate 17 at gate pad side 40d is about 8500 angstroms, for example, if an inorganic passivation film is used.

The seal 31 at the data pad side 40a is formed above a patterned active layer 45 formed on a gate insulation layer 42 made of silicon nitride ($SiN_x$), a source/drain electrode 46 is formed on the active layer 45, and a passivation film 43 is formed on the source/drain electrode 46. The total thickness of patterns formed on the lower substrate 17 at the data pad side 40a is about 9500 angstroms, for example, if an inorganic passivation film is used. The dummy seals and seals 31 at the liquid crystal injection port side 40b and open side 40c are formed at regions of the substrate having a passivation film 43 formed on the gate insulation layer 42. The total thickness of patterns formed on the lower substrate 17 at regions in between the panels where dummy seals are formed is about 6000 angstroms, for example, if an inorganic passivation film is used.

As described above, the thickness of the patterns formed on the lower substrate differs according to the attachment regions of the lower substrate. Thus, if a seal with a uniform thickness is formed for attaching the upper and lower substrates, the liquid crystal cell gap will not be uniform across an entire panel of the substrate. Accordingly, optical characteristics of the panel will be skewed or incorrect in portions of a panel where the liquid crystal cell gap is not uniform. In addition, when a large-scale upper substrate 11 and lower substrate 17 are attached, the capability of exhausting air between the substrates is degraded by long narrow passages, such as shown in the section (IV–IV') in shown in FIG. 5, between the dummy seals. Furthermore, the dummy seals 37 may be broken down by air exhaust pressure.

SUMMARY OF THE INVENTION

Therefore, an object of the present invention is to provide a liquid crystal display device in which liquid crystal cell gaps of a gate pad side, a liquid crystal injection portion side and a source pad side are formed to be the same.

Another object of the present invention is to provide a liquid crystal display device which prevents a seal from being broken down due to an air exhaust pressure during a process of removing air existing between substrates during or after attaching an upper and a lower substrates.

To achieve these and other advantages and in accordance with the purpose of the present invention, as embodied and broadly described herein, there is provided a liquid crystal display device including a first and second substrates coupled to each other having a dummy region and a panel region, at least one first seal in the dummy region, a second seal along a peripheral portion of the panel region, wherein the second seal has a liquid crystal injection port and a liquid crystal layer between the first and second substrates, wherein a cell gap-determining thickness of the first seal is substantially same as a cell gap-determining thickness of the second seal.

In another embodiment, a method for fabricating a liquid crystal display device includes providing first and second substrates having a dummy region and a panel region, forming at least one first seal in the dummy region, forming a second seal along a peripheral portion of the panel region having a liquid crystal injection port and forming a liquid crystal layer between the first and second substrates, wherein a cell gap-determining thickness of the first seal is substantially same as a cell gap-determining thickness of the second seal.

In another embodiment, a method for fabricating a liquid crystal display device includes preparing first and second substrates having a panel region and a dummy region, forming gate pads, data pads and a thin film transistor array on the first substrate in the panel region, forming a color filter layer, a black matrix layer and a common electrode on the second substrate in the panel region, forming a seal pattern with a liquid crystal injection port at one side of the panel region along a peripheral portion of the panel region, forming an insulation layer on the first substrate, forming a passivation layer on the insulation layer, removing a portion of both the insulation layer and the passivation layer, forming two dummy seals on the passivation layer in the dummy region with the portion of both the insulation layer and the passivation layer between the dummy seals and forming a liquid crystal layer between the first and second substrates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4A, FIG. 4B and FIG. 4C are sectional views showing seal attachment regions in a related art liquid crystal display panel.

FIG. 5 is a sectional view showing an air removing passage of a dummy seal region along IV–IV' of FIG. 3.

DETAILED DESCRIPTION OF THE PREFERRED EMBODIMENTS

Reference will now be made in detail to the preferred embodiments of the present invention, examples of which are illustrated in the accompanying drawings.

Figure 1:
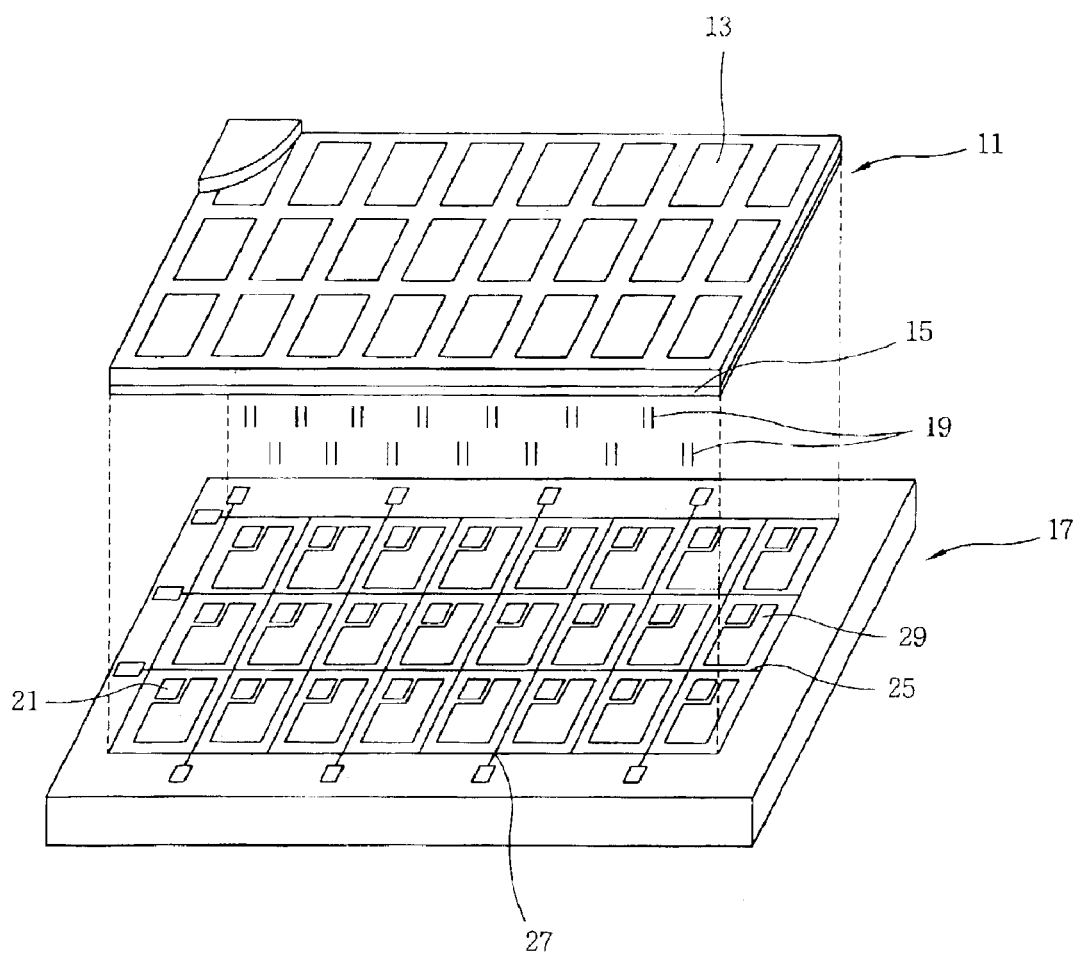
FIG. 1 is an exploded perspective view showing the structure of a related art liquid crystal display device.
Figure 2:
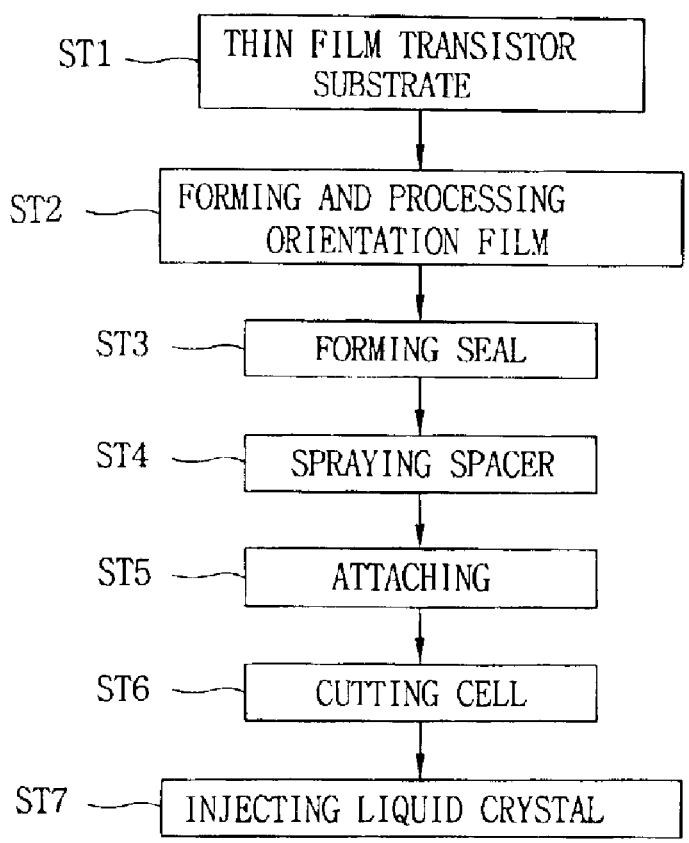
FIG. 2 is a flow chart of a process for fabricating a liquid crystal display panel from a master panel.
Figure 3:
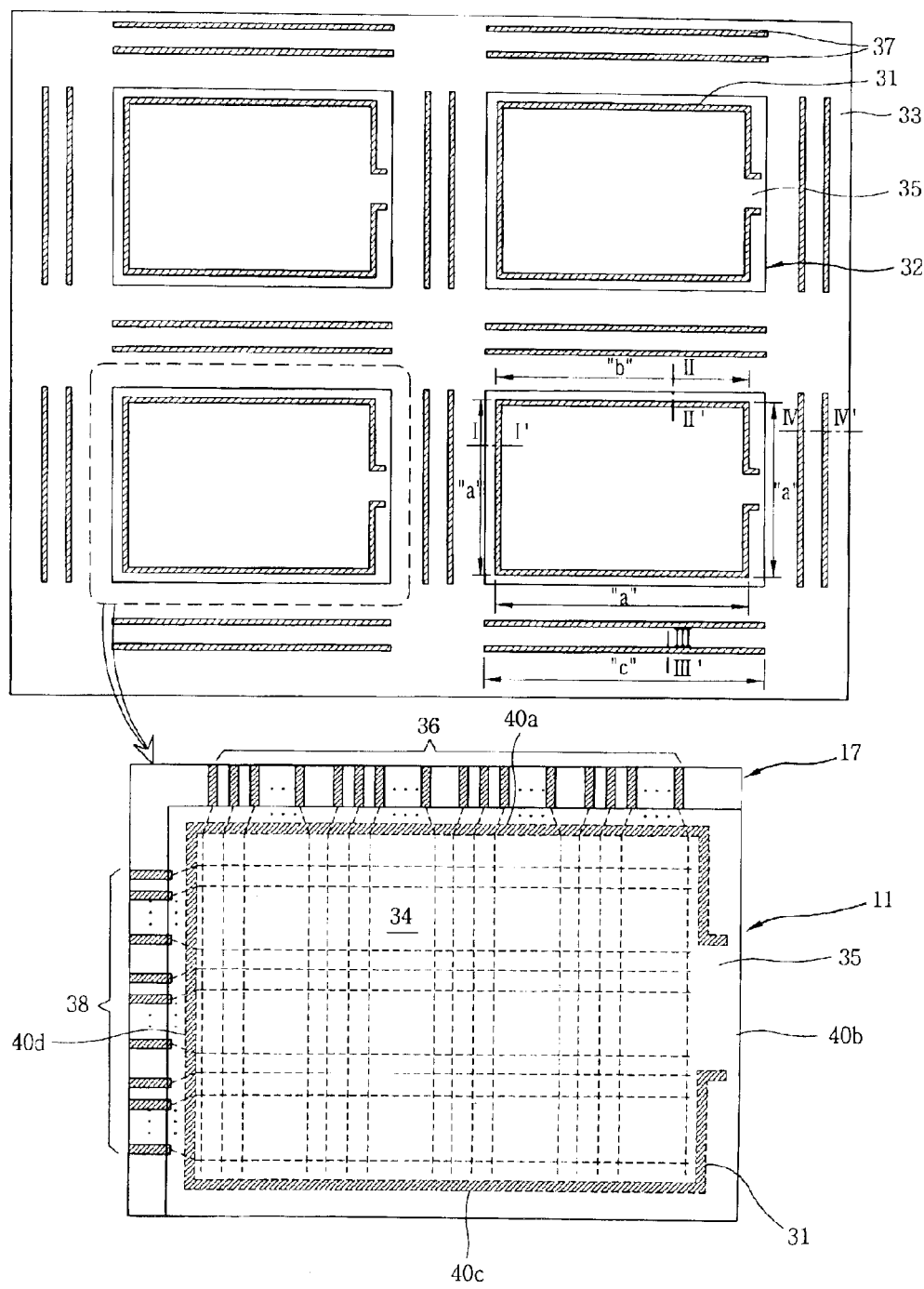
FIG. 3 is a drawing illustrating a seal printed on a large-scale glass substrate where a plurality of unit panels are formed.
Figure 6A:
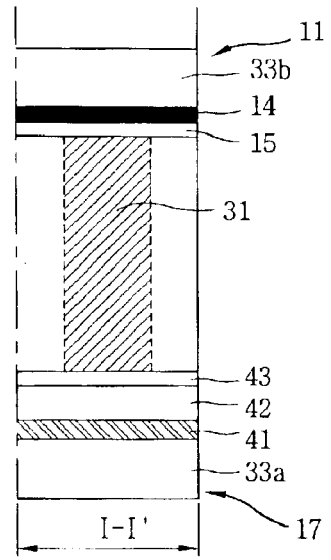
FIG. 6 is a sectional view showing a liquid crystal display panel having seals in accordance with an example of the present invention.
Figure 6B:
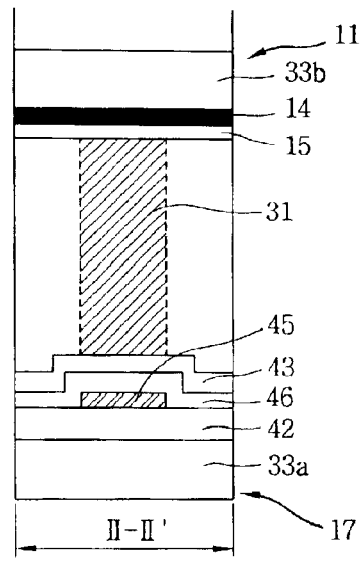
Figure 6C:
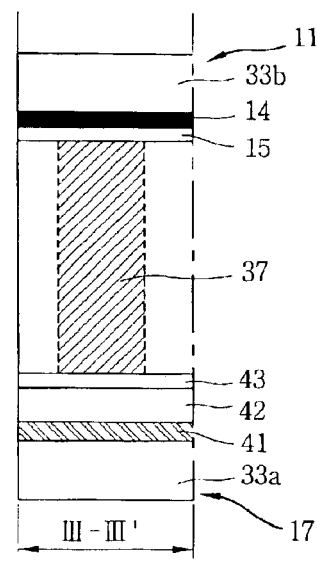

FIG. 6A shows a sectional view of a seal attachment region for the gate pad side of an LCD panel, in accordance with an exemplary embodiment of the present invention. FIG. 6B shows the sectional view of a seal attachment region for a data pad side. FIG. 6C shows the sectional view of the seal attachment region for the dummy seals.

A mask is formed on the upper substrate 11 to prevent light leakage between pixels. The mask includes a black matrix 14 made of chrome (Cr) or a chrome oxide ($CrO_x$). A common electrode 15 made of a transparent Indium tin oxide (ITO) material is formed on the mask.

At the injection port side 40b, the open side 40c and the gate pad side 40d, the lower substrate 17 includes a gate electrode layer 41, a gate insulation layer 42 formed on the gate electrode layer 41, and a passivation film 43 formed on the gate insulation layer 42, as shown in FIG. 6A. The gate electrode layer 41 is formed in a process together with a gate electrode and a gate line for a thin film transistor. The gate electrode can be made of chrome (Cr), Molybdenum (Mo), tantalum (Ta), antimony (Sb), or the like. The gate insulation layer 42 is formed across the entire surface of the substrate by plasma-depositing a material such as silicon nitride ($SiN_x$) or silicon oxide ($SiO_x$). The passivation film 43 is formed through the entire surface of the substrate, and may be formed by using an inorganic substance such as silicon nitride ($SiN_x$) or silicon oxide ($SiO_x$) or by using an organic substance such as Benzocyclobutene (BCB) or acryl for a high aperture ratio structure. Therefore, a total thickness of the gate electrode layer 41, the gate insulation layer 42 and the passivation film formed on the lower substrate is about 8500 angstroms, for example, when an inorganic passivation film is used. A seal 31 is formed on the passivation layer 43 between the upper and lower substrates.

The cross-section of FIG. 6B depicts an upper substrate 11 at the data pad side of a panel having a mask to prevent light leakage between pixels. The mask is a black matrix 14 made of Cr or $CrO_x$. The upper substrate 11 further includes a common electrode 15 made of a transparent conductive material, such as ITO. FIG. 6B also depicts a lower substrate 17 that includes a gate insulation layer 42 formed on the glass substrate 33a, an active layer 45 formed on the gate insulation layer 42, a source/drain electrode layer 46 formed as a source input terminal on the active layer 45, and a passivation film 43 formed on the source/drain electrode layer 46. The gate insulation layer 42 is formed across the entire surface of the lower substrate 17 by plasma-depositing a material, such as silicon nitride ($SiN_x$) or silicon oxide ($SiO_x$).

The active layer 45 is formed under the source/drain electrode layer 46, and is used as a source input terminal to repair the source/drain electrode layer 46, as shown in FIG. 6B. The active layer 45 includes a semiconductor layer made of amorphous silicon and n+ doped ohmic layer. The source/drain electrode layer 46 is formed together with the source/drain electrode and the data line of the thin film transistor. The source/drain electrode layer 46 is formed by depositing a metal such as chrome or a chrome alloy by a sputtering method and patterning it by a photolithography method. The passivation film 43 is formed through the entire surface of the substrate, and can be made of an inorganic substance such as silicon nitride ($SiN_x$) or silicon oxide ($SiO_x$), or can be made of an organic substance such as BCB or acryl for a high aperture ratio structure. Therefore, a total thickness of the gate insulation layer 42, the active layer 45, the source/drain electrode layer 46 and the passivation film 43 formed on the lower substrate is about 9500 angstroms, for example, when an inorganic passivation film is used.

The cross-section of FIG. 6C depicts the region of a dummy seal 31, which has a cell gap-determining thickness that is substantially same as a cell gap-determining thickness of the gate pad side 40d of a panel. A mask is formed on the upper substrate 11 to prevent a light leakage between pixels as a black matrix 14 made of chrome (Cr) or chrome oxide ($CrO_x$). A common electrode 15 made of a transparent conductive material, such as ITO, is formed on the black matrix 14. The lower substrate 17 includes a gate electrode layer 41 formed on the substrate 33a, a gate insulation layer 42 formed on the gate electrode layer 41 and a passivation film 43 formed on the gate insulation layer 42.

The gate electrode layer 41 is formed to make the cell gap-determining thickness of seal in the dummy seal region the same size as the cell gap-determining thickness of seal at the gate pad side. The gate electrode layer 41 is formed together in the same process of forming the gate electrodes and the gate lines of the thin film transistors and made of a metal material, such as chrome (Cr), molybdenum (Mo), tantalum (Ta) or antimony (Sb). Subsequently, the gate insulation layer 42 is formed on the gate electrode layer 41 by plasma-depositing a material such as silicon nitride ($SiN_x$) or silicon oxide ($SiO_x$) to a thickness of about 4000 angstroms, for example.

The passivation film 43 is formed across the entire surface of the substrate. If an inorganic substance such as silicon nitride ($SiN_x$) or silicon oxide ($SiO_x$) is used for the passivation film 43, its thickness is about 2000 angstroms, while if an organic substance such as BCB or acryl is used as a material for the passivation film 43 for a high aperture ratio structure, its thickness is about 1.5~2.3 $\mu$m. Thus, when an inorganic passivation film is used, the total thickness of the gate electrode layer 41, the gate insulation layer 42 and the passivation film 43 formed on the lower substrate is about 8500 angstroms, which is the same as the thickness of the pattern formed at the lower substrate of the gate pad side.

By inserting the gate insulation layer 41 into a region in where a dummy seal is attached and where seal 31 is formed at the liquid crystal injection port side and the open side, the same cell gap at the gate pad side, the liquid crystal injection port side and the open side can be formed using seals that all have the same cell gap-determining thickness. Referring back to the related art, in the sectional structure of a panel formed by attaching an upper substrate with a color filter formed thereon and a lower substrate with a thin film transistor formed thereon, the upper substrate includes the black matrix and the common electrode for every portion of the panel where a seals are formed having different cell gap-determining thicknesses. This results because resulting patterns on the lower substrate have different thicknesses or heights above the substrate. In order to solve such a problem, the present invention inserts a gate electrode layer in the dummy seal regions and in the liquid crystal injection port side and the open side. That is, by inserting the gate electrode layer on the lower substrate at the dummy seal regions and in the liquid crystal injection port side and the open side, the same liquid crystal cell gap with the gate pad side, the liquid crystal injection port side and the open side is maintained with a seal have the same cell gap-determining thickness as the dummy seal, so that degradation of a picture quality due to a lack of uniformity of the cell gap can be prevented.

Figure 7:
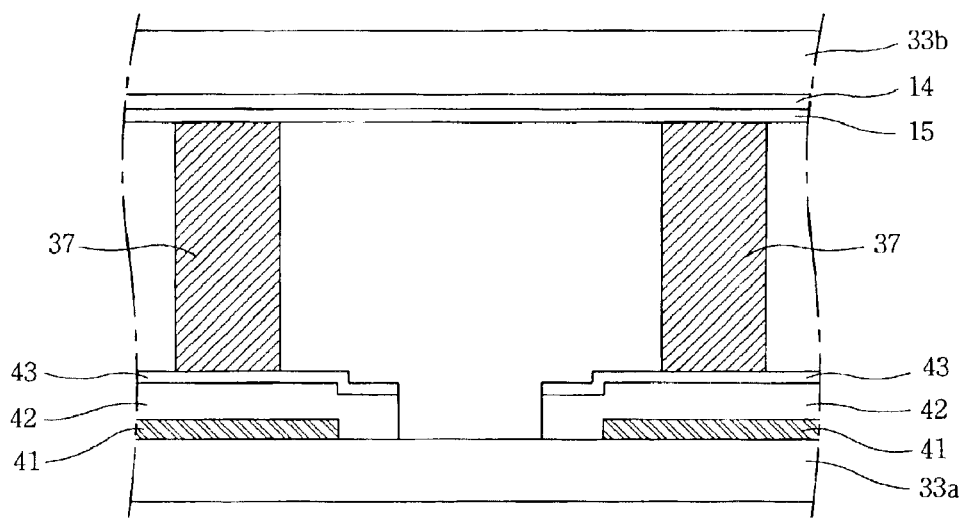
FIG. 7 is a sectional view showing an air removing passage at a dummy seal region in accordance with an example of the present invention.

After the upper and lower substrates are attached, air between the substrates is exhausted outwardly for injection of liquid crystal. Since the air removing passage formed between the substrates is narrow in the relate art, it takes a lot of time to remove air between the substrates. Further, the dummy seals may fail to withstand the air exhaust pressure and break down during the process of removing the air under a vacuum in the related art. In the present invention, as shown in FIG. 7, the air removing passage between dummy seals is widened by a portion of both the passivation film 43 and the gate insulation layer 42 formed on the lower substrate 17.

A method for widening the air removing passage includes forming a gate electrode layer 41 in a dummy seal area of the lower substrate 33a. A gate insulation layer 42 and a passivation film 43 are then formed. At this time, a portion of both the passivation film 43 and the gate insulation layer 42, which otherwise would have been between subsequently formed dummy seals, are etched to widen the air removing passage that will be between subsequently formed dummy seals. For example, if the gate insulation layer 42, has a thickness of 2500 angstroms and the passivation film has a thickness of 2000 angstroms, the height of the air removing passage is increased by 4500 angstroms.

Besides the method of widening the air removing passage vertically, the air removing passage can be improved by widening the interval between the dummy seals. By widening the air removing passage in this manner, after the upper substrate and the lower substrate are attached, a time required for removing air existing between the substrates can be shortened, and the dummy seals will not be broken down due to the air exhaust pressure as the air is removed under a vacuum.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   first and second substrates coupled to each other having a dummy region and a panel region;
   at least one first seal in the dummy region;
   a second seal along a peripheral portion of the panel region, wherein the second seal has a liquid crystal injection port; and
   a liquid crystal layer between the first and second substrates,
   wherein a cell gap-determining thickness of the first seal is substantially same as a cell gap-determining thickness of the second seal and the first seal is on a region including a gate electrode layer, a gate insulation layer and a passivation film on the first substrate.

2. The device of claim 1, wherein the second seal is on a region including a gate electrode layer, a gate insulation layer and a passivation film, wherein the region is at least one of a gate pad side, the liquid crystal injection port side and a open side of a panel region.

3. The device of claim 1, wherein the second substrate includes:
   a black matrix layer on a substrate;
   a color filter layer on the black matrix layer; and
   a common electrode on the color filter layer.

4. The device of claim 1, wherein the first substrate between first seals of two dummy regions is exposed.

5. A method for fabricating a liquid crystal display device comprising:
   providing first and second substrates having a dummy region and a panel region;
   forming an insulation layer on the first substrate;
   forming a passivation layer on the insulation layer;
   exposing the first substrate by removing a portion of both the insulation layer and the passivation layer in the dummy region between where at least one first seal will be formed;
   forming at least one first seal in the dummy region;
   forming a second seal along a peripheral portion of the panel region having a liquid crystal injection port; and
   forming a liquid crystal layer between the first and second substrates,
   wherein a cell gap-determining thickness of the first seal is substantially same as a cell gap-determining thickness of the second seal.

6. The method of claim 5, further comprising fanning a thin film transistor, a gate/data pads and a pixel electrode on the first substrate.

7. The method of claim 5, further comprising:
   forming a black matrix layer on the second substrate;
   forming a color filter layer on the black matrix layer; and
   forming a common electrode on the color filter layer.

8. A method for fabricating a liquid crystal display device comprising:
   preparing first and second substrates having a panel region and a dummy region;
   forming gate pads, data pads and a thin film transistor array on the first substrate in the panel region;
   forming a color filter layer, a black matrix layer and a common electrode on the second substrate in the panel region;
   forming a seal pattern with a liquid crystal injection port at one side of the panel region along a peripheral portion of the panel region;
   forming an insulation layer on the first substrate;
   forming a passivation layer on the insulation layer;
   removing a portion of both the insulation layer and the passivation layer at a first area of the first substrate;
   forming two dummy seals on the passivation layer in the dummy region such that the first area is between the dummy seals; and
   forming a liquid crystal layer between the first and second substrates.

9. The method of claim 8, further comprising:
   forming a gate electrode on the first substrate;
   forming a gate insulation layer on the gate electrode;
   forming a passivation film on the gate insulation layer; and
   etching the gate insulation layer and the passivation film between the dummy seals.

10. The method of claim 8, further comprising:
    forming a gate electrode layer at a gate pad region corresponding to the seal pattern;
    forming a gate insulation layer on the gate electrode; and
    forming a passivation film on the gate insulation layer.

11. The method of claim 8, further comprising:
    forming a gate insulation layer at a source pad region corresponding to the seal pattern;
    forming an active layer on the gate insulation layer;
    forming source and drain electrodes on the active layer; and
    forming a passivation layer on the source and drain electrodes.

12. The method of claim 8, wherein a cell gap-determining thickness of the seal pattern is substantially same as a cell gap-determining thickness of the dummy seal.

13. A liquid crystal display device comprising: first and second substrates coupled to each other having dummy regions and panel regions;
    first seals respectively positioned in the dummy regions, wherein each of the first seals is on a region including a gate electrode layer, a gate insulation layer and a passivation film on the first substrate;
    a second seal along a peripheral portion of the panel region, wherein the second seal has a liquid crystal injection port; and
    a liquid crystal layer between the first and second substrates,
    wherein the first substrate is exposed between a pair of first seals of two of the dummy regions.

14. The device of claim 13, wherein the second seal is on a region including a gate electrode layer, a gate insulation layer and a passivation film, wherein the region is at least one of a gate pad side, the liquid crystal injection port side and an open side of the panel region.

15. The device of claim 13, wherein the second substrate includes:
    a black matrix layer on a substrate;
    a color filter layer on the black matrix layer; and
    a common electrode on the color filter layer.

16. The device of claim 13, wherein a cell gap-determining thickness of the first seals are substantially the same as a cell gap-determining thickness of the second seal.

* * * * *